United States Patent
Tajika

(10) Patent No.: US 11,120,696 B2
(45) Date of Patent: Sep. 14, 2021

(54) CONTROL DEVICE, PROGRAM, CONTROL METHOD, AND FLIGHT VEHICLE

(71) Applicant: HAPSMobile Inc., Tokyo (JP)

(72) Inventor: Akihiko Tajika, Saitama (JP)

(73) Assignee: HAPSMobile Inc., Tokyo (JP)

( * ) Notice: Subject to any disclaimer, the term of this patent is extended or adjusted under 35 U.S.C. 154(b) by 0 days.

(21) Appl. No.: 17/095,766

(22) Filed: Nov. 12, 2020

(65) Prior Publication Data

US 2021/0065562 A1 Mar. 4, 2021

Related U.S. Application Data

(63) Continuation of application No. PCT/JP2019/028943, filed on Jul. 24, 2019.

(30) Foreign Application Priority Data

Aug. 20, 2018 (JP) .............................. JP2018-153876

(51) Int. Cl.
*G06F 17/00* (2019.01)
*G08G 5/00* (2006.01)
(Continued)

(52) U.S. Cl.
CPC ......... *G08G 5/0043* (2013.01); *B64C 39/024* (2013.01); *G05D 1/0607* (2013.01);
(Continued)

(58) Field of Classification Search
CPC .. G08G 5/0043; G08G 5/0013; G08G 5/0091; H01Q 1/28; B64C 39/024;
(Continued)

(56) References Cited

U.S. PATENT DOCUMENTS 7,113,852 B2 * 9/2006 Kapadia ................. G07C 5/008
701/32.6
7,231,294 B2 * 6/2007 Bodin .................... G01C 21/20
343/705
(Continued)

FOREIGN PATENT DOCUMENTS

| JP | 2002211496 A | 7/2002 |
| JP | 2004336408 A | 11/2004 |
| JP | 2005082018 A | 3/2005 |

OTHER PUBLICATIONS

Decision to Grant a Patent issued for counterpart Japanese Application No. 2018-153876, issued by the Japanese Patent Office dated Mar. 10, 2020 (drafted on Mar. 6, 2020).

(Continued)

*Primary Examiner* — Ronnie M Mancho

(57) ABSTRACT

Provided is a control device for controlling a flight vehicle including a solar cell panel, and an antenna for forming a communication area on the ground to provide wireless communication service for a user terminal in the communication area by using electric power generated by the solar cell panel. The control device comprises a control unit for controlling a first flight vehicle and a second flight vehicle so that during a first time period, the second flight vehicle of the first flight vehicle and the second flight vehicle is caused not to cover a first target area and the first flight vehicle is caused to cover the first target area, and during a second time period following the first time period, the first flight vehicle is caused not to cover the first target area and the second flight vehicle is caused to cover the first target area.

10 Claims, 13 Drawing Sheets

(51) Int. Cl.
*H04W 4/42* (2018.01)
*B64C 39/02* (2006.01)
*G05D 1/06* (2006.01)
*G05D 1/10* (2006.01)
*H01Q 1/28* (2006.01)

(52) U.S. Cl.
CPC .......... *G05D 1/105* (2013.01); *G08G 5/0013* (2013.01); *G08G 5/0091* (2013.01); *H01Q 1/28* (2013.01); *H04W 4/42* (2018.02); *B64C 2201/042* (2013.01); *B64C 2201/14* (2013.01)

(58) Field of Classification Search
CPC .......... B64C 2201/14; B64C 2201/042; G05D 1/0607; G05D 1/105; H04W 4/42
USPC ........................................................ 701/120
See application file for complete search history.

(56) References Cited

U.S. PATENT DOCUMENTS

| | | | | |
|---|---|---|---|---|
| 8,280,626 | B2 * | 10/2012 | Klooster | G08G 5/0091 |
| | | | | 701/415 |
| 9,070,283 | B2 * | 6/2015 | Samuthirapandian | ........................ |
| | | | | G08G 5/0078 |
| 9,412,278 | B1 * | 8/2016 | Gong | G08G 5/0091 |
| 9,472,106 | B2 * | 10/2016 | Bailey | G01C 23/00 |
| 9,558,672 | B2 * | 1/2017 | McCann | G01W 1/00 |
| 9,638,829 | B2 * | 5/2017 | Davoodi | G01V 11/002 |
| 9,741,255 | B1 * | 8/2017 | Navot | G08G 5/0078 |
| 9,948,380 | B1 | 4/2018 | Vos | |
| 10,121,384 | B2 * | 11/2018 | Hale | G08G 5/0021 |
| 10,168,695 | B2 * | 1/2019 | Barnickel | G05D 1/0033 |
| 10,269,253 | B2 * | 4/2019 | Borgyos | G08G 5/0082 |
| 10,553,122 | B1 * | 2/2020 | Gilboa-Amir | G06Q 10/0832 |
| 10,586,464 | B2 * | 3/2020 | Dupray | H04B 7/18504 |
| 10,803,758 | B1 * | 10/2020 | Barr | G01S 17/95 |
| 10,859,398 | B2 * | 12/2020 | Sweet | G01C 23/00 |
| 2012/0083997 | A1 * | 4/2012 | Meador | G06Q 10/0631 |
| | | | | 701/120 |
| 2012/0245835 | A1 * | 9/2012 | Weitz | G08G 5/0013 |
| | | | | 701/120 |
| 2014/0257684 | A1 * | 9/2014 | Wilder | G08G 5/025 |
| | | | | 701/121 |
| 2016/0105806 | A1 * | 4/2016 | Noerpel | H01Q 1/288 |
| | | | | 455/12.1 |
| 2016/0156406 | A1 * | 6/2016 | Frolov | H04W 16/28 |
| | | | | 455/431 |
| 2016/0304217 | A1 * | 10/2016 | Fisher | B64F 1/222 |
| 2017/0155443 | A1 * | 6/2017 | Haziza | H04B 1/69 |
| 2017/0302368 | A1 * | 10/2017 | Trott | H04B 7/18502 |
| 2018/0262264 | A1 * | 9/2018 | Alexander | H04B 7/18504 |
| 2018/0270761 | A1 * | 9/2018 | Garcia | H04W 52/0258 |

OTHER PUBLICATIONS (ISA/237) Written Opinion of the International Search Authority for International Patent Application No. PCT/JP2019/028943, by the Japan Patent Office dated Oct. 29, 2019.

* cited by examiner

334 ic # CONTROL DEVICE, PROGRAM, CONTROL METHOD, AND FLIGHT VEHICLE

The contents of the following Japanese and PCT applications are incorporated herein by reference:
NO. 2018-153876 filed in JP on Aug. 20, 2018, and
NO. PCT/JP2019/028943 filed in WO on Jul. 24, 2019.

BACKGROUND

1. Technical Field

The present invention relates to a control device, a program, a control method, and a flight vehicle.

2. Related Art

Known is a flight vehicle that includes an antenna and flies in the stratosphere, so as to provide a stratosphere platform (for example, refer to Patent Document 1).

CITATION LIST

Patent Document

Patent Document 1: Japanese Unexamined Patent Application Publication No. 2002-211496

Technical Problem

It is preferable to provide technology capable of covering appropriately a target area on the ground even though an airstream in a flight area in which a flight vehicle is flying changes.

DESCRIPTION OF EXEMPLARY EMBODIMENTS

Hereinafter, the present invention will be described through embodiments of the invention. However, the following embodiments do not limit the invention defined in the claims. Also, all combinations of features described in the embodiments are not necessarily essential to solutions of the invention.

Figure 1:
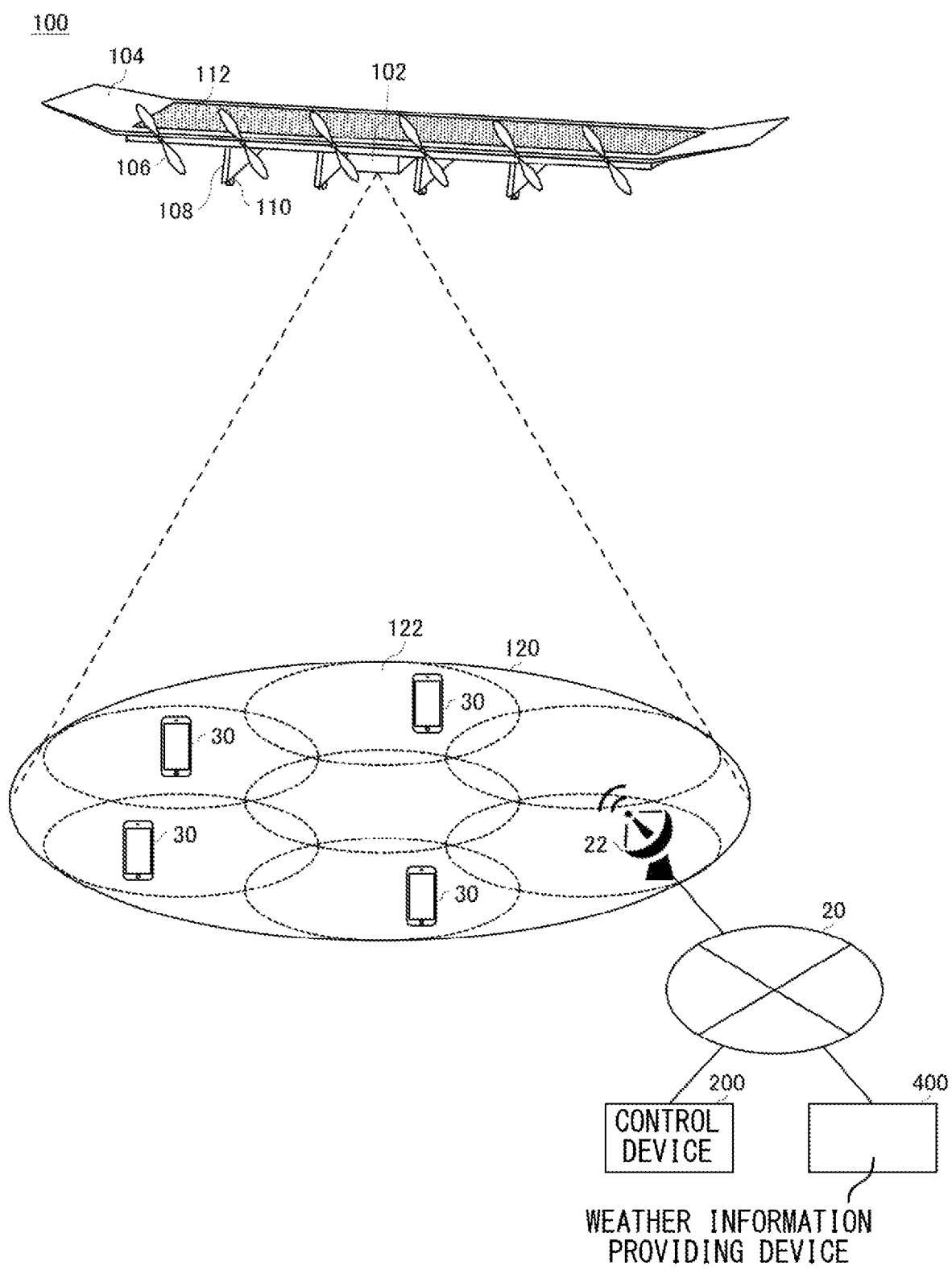
FIG. 1 shows schematically an example of a flight vehicle 100.

FIG. 1 shows schematically an example of a flight vehicle 100. The flight vehicle 100 comprises a main body 102 and a main wing 104. The main body 102 includes propellers 106, skids 108, and wheels 110. The main wing 104 includes a solar cell panel 112.

The main body 102 includes a battery and an antenna, which are not shown. Electric power generated by the solar cell panel 112 is stored in the battery. The flight vehicle 100 can fly by rotating the propellers 106 with the electric power stored in the battery. The flight vehicle 100 also forms a communication area 120 on the ground to provide wireless communication service for user terminals 30 in the communication area 120 by the antenna. The antenna may be a multi-beam antenna, for example, and the communication area 120 may be formed by a plurality of cells 122. The flight vehicle 100 flies in the stratosphere to provide wireless communication service for the user terminals 30 on the ground, for example. The flight vehicle 100 may function as a stratosphere platform.

The user terminal 30 may be any communication terminal as long as it can communicate with the flight vehicle 100. For example, the user terminal 30 is a mobile phone such as a smartphone. The user terminal 30 may also be a tablet terminal, a PC (Personal Computer) and the like.

The flight vehicle 100 provides the wireless communication service for the user terminal 30 by relaying communication between the user terminal 30 and a network 20 on the ground, for example. The network 20 may include a core network that is provided by a telecommunication carrier. The network 20 may also include the Internet.

The flight vehicle 100 may communicate with the network 20 via a gateway 22 in the communication area 120, of gateways 22 arranged in each region on the ground. For example, the flight vehicle 100 may also communicate with the network 20 via a communication satellite (not shown).

The flight vehicle 100 transmits data received from the user terminal 30 in the communication area 120 to the network 20, for example. When the flight vehicle 100 receives data addressed to the user terminal 30 in the communication area 120 via the network 20, for example, the flight vehicle 100 also transmits the data to the user terminal 30.

The flight vehicle 100 may be controlled by a control device 200. The flight vehicle 100 flies according to an instruction transmitted by the control device 200, for example. The instruction may be transmitted from the control device 200 to the flight vehicle 100 via the gateway 22 and the network 20. The instruction may be also transmitted from the control device 200 to the flight vehicle 100 via the communication satellite.

The control device 200 controls a plurality of flight vehicles 100 to cause each of the plurality of flight vehicles 100 to cover a target area on the ground based on the communication area 120. The control device 200 controls the plurality of flight vehicles 100 in a mode (also referred to as 'first mode') where each of the plurality of flight vehicles 100 covers one target area, for example. In the first mode, each of the plurality of flight vehicles 100 covers each target area while circling over each target area. The circling over the target area may also be referred to as stationary flight.

For example, the control device 200 also controls the plurality of flight vehicles 100 in a mode (also referred to as 'second mode') where each of the plurality of target areas is covered by the plurality of flight vehicles 100. In the second mode, each of the plurality of target areas is covered by two or more flight vehicles 100.

In the second mode, a coverage aspect of the target area may be different depending on time periods. Herein, a case where each of the plurality of target areas is covered by the two flight vehicles 100 is exemplified.

The control device 200 divides one day into a plurality of time periods, and changes coverage forms by the two flight vehicles 100 for each time period. The number of time periods may be any number. For example, the control device 200 divides one day into three time periods. For example, the control device 200 changes coverage forms by the two flight vehicles 100 in a first half time period during the night-time, a second half time period during the night-time and a time period during the day-time. The first half time period during the night-time may be an example of the first time period, the second half time period during the night-time may be an example of the second time period, and the time period during the day-time may be an example of the third time period.

As an example, the control device 200 change coverage forms by the two flight vehicles 100 in the first 6 hours of the night-time (18:00 to 24:00), of the second 6 hours of the night-time (0:00 to 6:00), and the other 12 hours (6:00 to 18:00). The first 6 hours of the night-time may be an example of the first time period, the second 6 hours of the night-time may be an example of the second time period, and the other 12 hours may be an example of the third time period.

The control device 200 controls the two flight vehicles so that during the first time period, the first flight vehicle 100 of the two flight vehicles covers the target area while circling over the target area and the second flight vehicle 100 of the two flight vehicles does not form the communication area and flies at an altitude or by a flying method where electric power is less consumed, for example. The flight vehicle 100 of the present embodiment consumes electric power of the battery for each of flight and formation of the communication area 120. Of the total power consumption, a ratio of electric power that is used for formation of the communication area 120 is relatively greater. For this reason, it is possible to reduce the power consumption of the flight vehicle 100 relatively largely by causing the second flight vehicle 100 not to form the communication area.

The control device 200 controls the two flight vehicles so that during the second time period, the second flight vehicle 100 covers the target area while circling over the target area and the first flight vehicle 100 does not form the communication area and flies at an altitude or by a flying method where electric power is less consumed. The control device 200 also controls the two flight vehicles 100 to cover the target area while circling over the target area during the third time period. By the above control, during the time period in which electric power can be generated by sunlight, it is possible to increase a communication capacity by causing the two flight vehicles 100 to cover the target area—as compared to a case where one flight vehicle 100 covers the target area. During the time period in which electric power cannot be generated by sunlight, electric power can be also saved by causing the two flight vehicles 100 to alternately cover the target area. Thus, it is possible to reduce a possibility that electric power stored in the battery will be exhausted at night.

For example, the control device 200 also controls the plurality of flight vehicles 100 in a mode (also referred to as 'third mode') where the plurality of flight vehicles 100 covers the target area while moving relative to the target area. In the third mode, the plurality of flight vehicles 100 covers the target area while moving relative to the target area. For example, movement that the flight vehicle 100 reaching an ending point of the target area moves to a starting point of the target area is repeated, so that the plurality of flight vehicles 100 covers the target area.

The control device 200 may control the plurality of flight vehicles 100 in any one of the plurality of modes, in response to an instruction from an operator. The control device 200 may also control the plurality of flight vehicles 100 in a mode corresponding to a situation of a flight area over the target area.

For example, in a case where a wind speed in the flight area is smaller than a first threshold value, the control device 200 controls the plurality of flight vehicles 100 in the first mode. As a specific example, when covering the four target areas, the control device 200 causes each of the four flight vehicles 100 to cover each of the four target areas.

In a case where the wind speed in the flight area becomes greater than the first threshold value, the control device 200 may control the plurality of flight vehicles 100 in the third mode. For example, the control device 200 adds one flight vehicle 100 to the four flight vehicles 100, and causes the five flight vehicles 100 to cover the four target areas while moving. The five flight vehicles 100 move along a wind direction, and the flight vehicle 100 that reaches the ending point of the target area moves to the starting point of the target area against the wind direction. Flying against the wind direction requires more electric power, as compared to flying along the wind direction. However, it is possible to supply necessary electric power by stopping the formation of the communication area by the flight vehicle 100 that moves from the ending point to the starting point.

In a case where the wind speed in the flight area is greater than a second threshold value larger than the first threshold value, the control device 200 may control the plurality of flight vehicles 100 in the second mode. For example, the control device 200 further adds three flight vehicles 100, and causes each two flight vehicles 100 to cover each of the four target areas. When the wind speed increases, electric power necessary for stationary flight increases. However, it is possible to supply necessary electric power by allotting the two flight vehicles 100 to one target area.

The control device 200 may receive information indicative of a situation of the flight area over the target area from a weather information providing device 400 that provides weather information of each area in the sky. Examples of the information indicative of the situation of the flight area include wind direction information, wind speed information, wind direction prediction information, wind speed prediction information, and the like.

The control device 200 may receive the information indicative of the situation of the flight area from the plurality of flight vehicles 100. The control device 200 may receive the information indicative of the situation of the flight area from the plurality of flight vehicles 100 via the gateway 22 and the network 20. The control device 200 may also receive the information indicative of the situation of the flight area from the plurality of flight vehicles 100 via the communication satellite. The flight vehicle 100 may transmit wind speed information indicative of a wind speed and wind direction information indicative of a wind direction in a flight area in which the flight vehicle 100 is flying, which are detected by a wind speed sensor, for example, to the control device 200.

FIG. 1 shows an example where the control device 200 is equipped on the ground, but the control device 200 is not limited thereto. For example, the control device 200 may be mounted on any one of the plurality of flight vehicles 100. The control device 200 may be mounted on the communication satellite.

Figure 2:
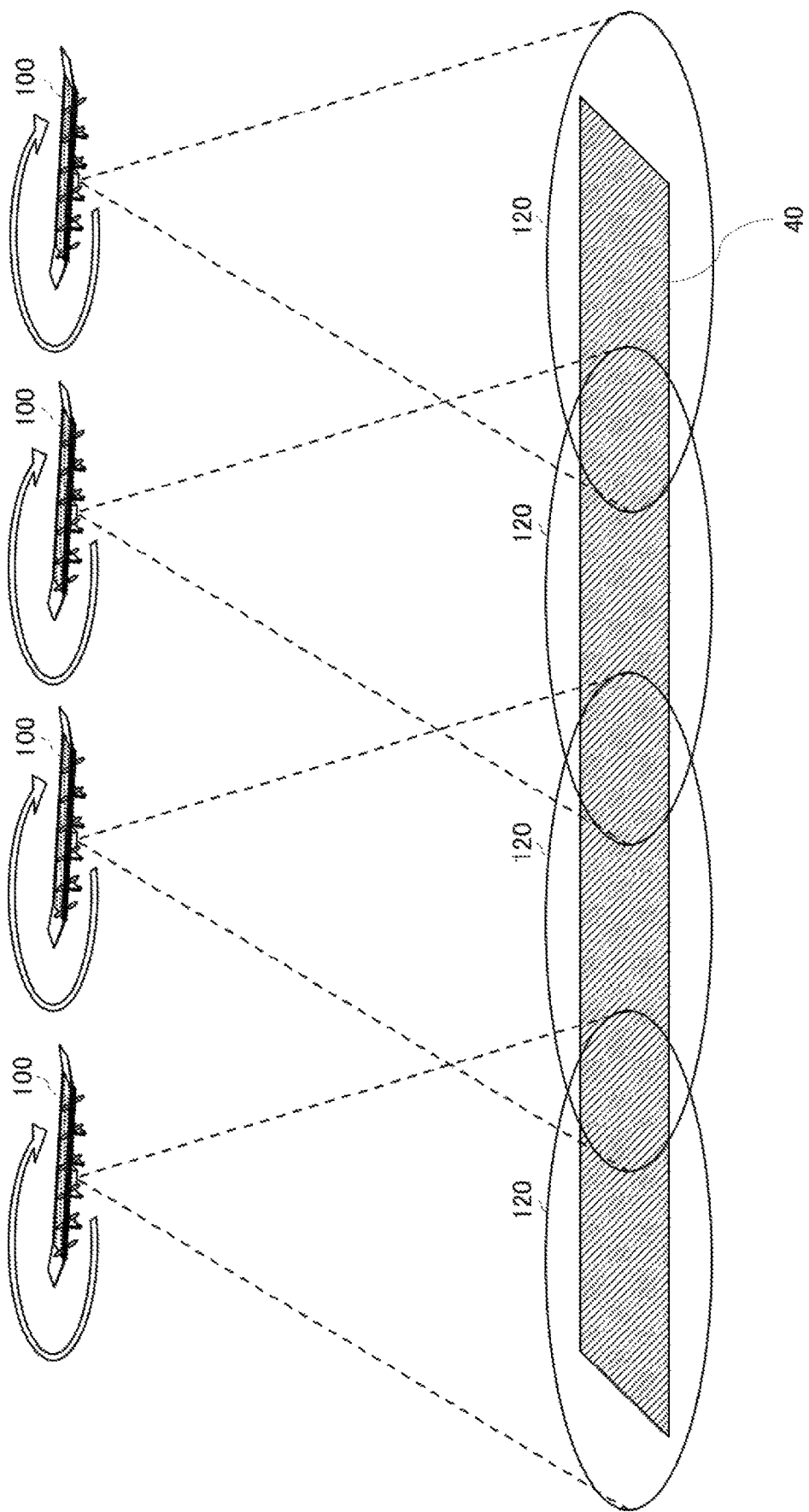
FIG. 2 shows schematically an example of a plurality of flight vehicles 100 that is controlled in a first mode.

FIG. 2 shows schematically an example of the plurality of flight vehicles 100 that is controlled in the first mode. Here, an example where the four flight vehicles 100 perform stationary flight over a target area 40 to cover the target area 40 is shown.

The target area 40 may be arbitrarily defined. The target area 40 is defined, for example, by countries. For example, the target area 40 may be also defined for each divisional unit defined differently in each country, such as prefectures and municipalities in Japan. The target area 40 may not correspond to such a division. For example, the target area 40 may be defined by an administrator of the flight vehicle 100 and an operator of the control device 200.

FIG. 2 exemplifies an aspect where the target area 40 has an elongated shape and the plurality of flight vehicles 100 is lined up in a row to cover the target area 40. However, the shape of the target area 40 is not limited thereto. The arrangement of the plurality of flight vehicles 100 is not limited to a row shape, and the flight vehicles may be arbitrarily arranged so as to cover the target area 40, according to a shape of the target area 40.

The control device 200 transmits a position of an area, which is covered by each flight vehicle, of the target area 40 to each of the plurality of flight vehicles 100, for example. The control device 200 may also transmit a position of a flight area in which each flight vehicle performs stationary flight to each of the plurality of flight vehicles 100. The control device 200 may perceive positions of the plurality of flight vehicles 100 by receiving position information, which indicates a position of each of the plurality of flight vehicles 100, from each of the plurality of flight vehicles 100.

Figure 3:
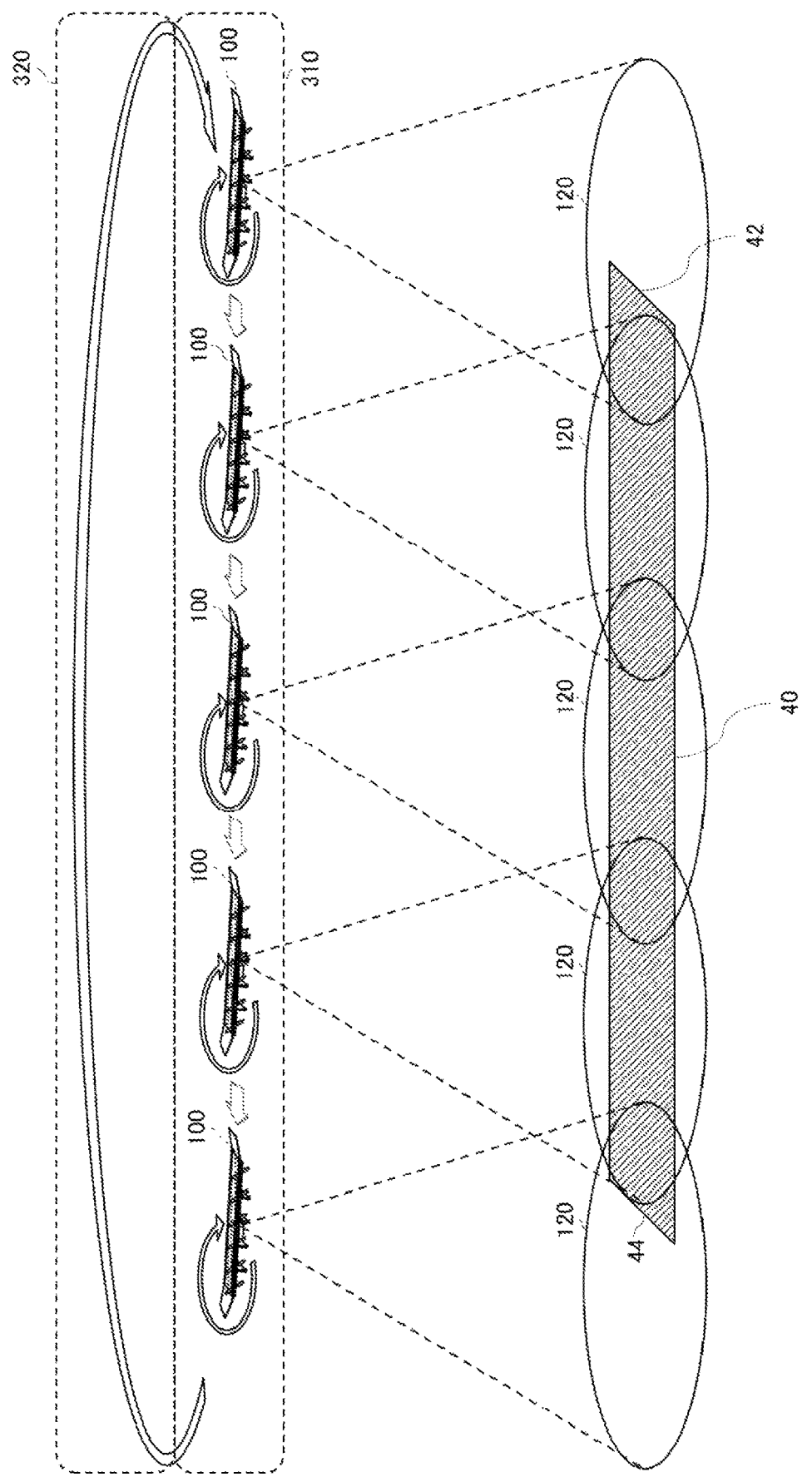
FIG. 3 shows schematically an example of the plurality of flight vehicles 100 that is controlled in a third mode.

FIG. 3 shows schematically an example of the plurality of flight vehicles 100 that is controlled in the third mode. Here, an example where the five flight vehicles 100 cover the target area 40 while moving relative to the target area 40 is shown.

A flight area 310 indicates a flight area in which the flight vehicles 100 fly when covering the target area 40. A flight area 320 indicates a flight area in which the flight vehicles 100 fly when moving from an ending point 44 to a starting point 42 of the target area 40. The flight area 310 may be an example of the first flight area. The flight area 320 may be an example of the second flight area.

The control device 200 transmits, to each of the plurality of flight vehicles 100, a position of the target area 40, positions of the starting point 42 and the ending point 44 of the target area 40, a moving route from the starting point 42 to the ending point 44, and a moving route from the ending point 44 to the starting point 42, for example. The control device 200 may decide the starting point 42 and the ending point 44 so that a tailwind is received in the moving route from the starting point 42 to the ending point 44, for example. The control device 200 may decide the moving route from the starting point 42 to the ending point 44 so as to cover the entire target area 40.

The control device 200 may decide such a moving route from the ending point 44 to the starting point 42 that electric power required to move from the ending point 44 to the starting point 42 is reduced as much as possible. For example, the control device 200 decides, as the moving route from the ending point 44 to the starting point 42, a moving route where a wind speed of headwind is smallest in flight areas from the ending point 44 to the starting point 42. This can reduce electric power required for the movement from the ending point 44 to the starting point 42, as compared to flying the flight vehicles in a flight area where a wind speed is stronger.

For example, the control device 200 may also decide the moving route from the ending point 44 to the starting point 42 at a lower altitude than that of the moving route from the starting point 42 to the ending point 44. Since a concentration of the air is higher and electric power necessary for flying is reduced at a lower altitude, the moving route is decided at such an altitude, so that it is possible to reduce electric power required to move from the ending point 44 to the starting point 42, as compared to flying the flight vehicles at a higher altitude.

In the example shown in FIG. 3, the flight vehicle 100 moves from the starting point 42 to the ending point 44 along the moving route from the starting point 42 to the ending point 44 while circling. That is, the flight vehicle 100 moves to shift from the starting point 42 toward the ending point 44 while circling. When reaching the ending point 44, the flight vehicle 100 moves from the ending point 44 to the starting point 42 along the moving route from the ending point 44 to the starting point 42.

Figure 4:
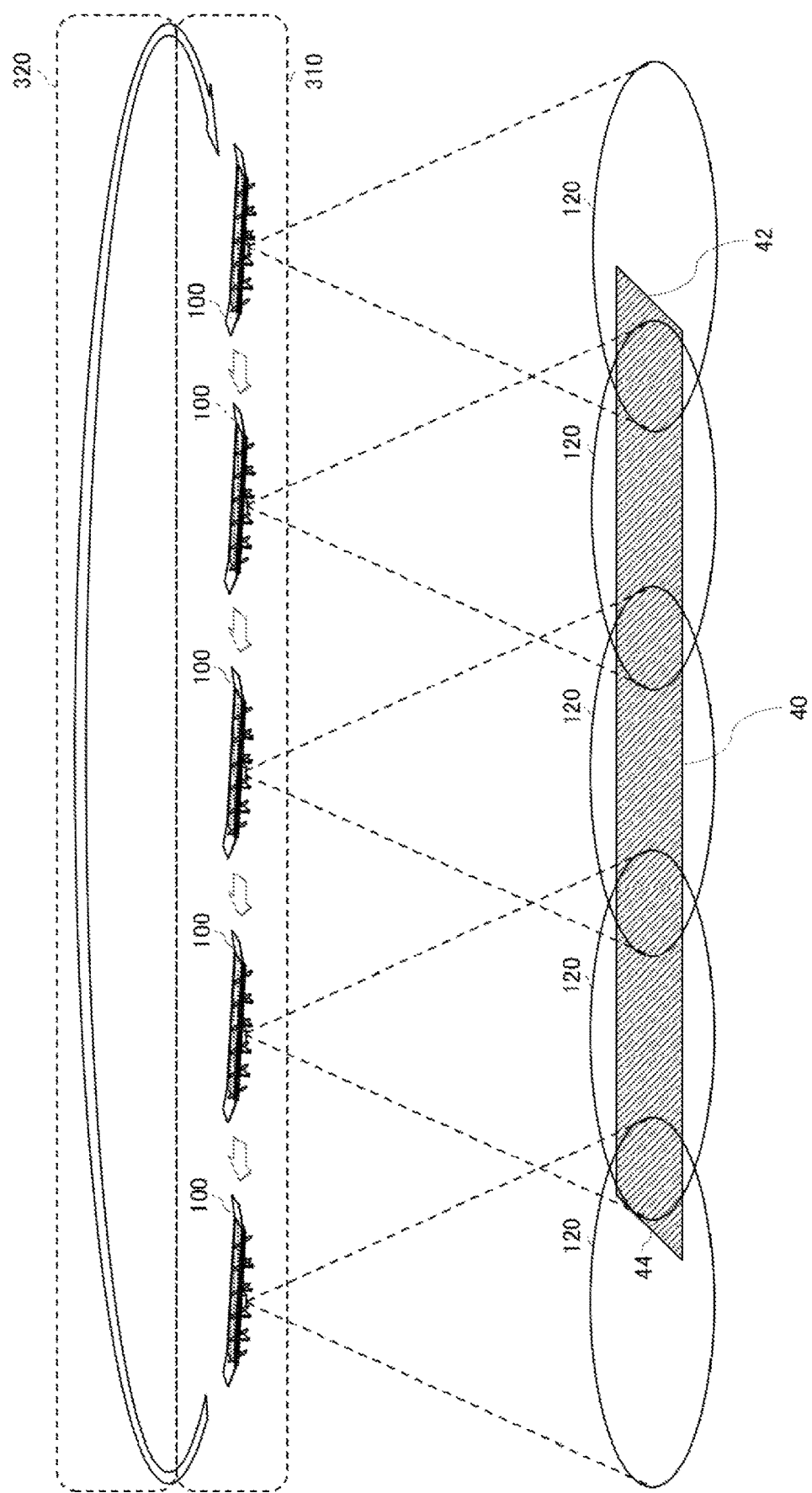
FIG. 4 shows schematically an example of the plurality of flight vehicles 100 that is controlled in the third mode.

FIG. 4 shows schematically an example of the plurality of flight vehicles 100 that is controlled in the third mode. Here, differences from FIG. 3 are mainly described. In FIG. 3, the example where the flight vehicle 100 moves from the starting point 42 to the ending point 44 while circling has been described. However, as shown in FIG. 4, the flight vehicle 100 may move from the starting point 42 to the ending point 44 along the moving route from the starting point 42 to the ending point 44 without circling.

Figure 5:
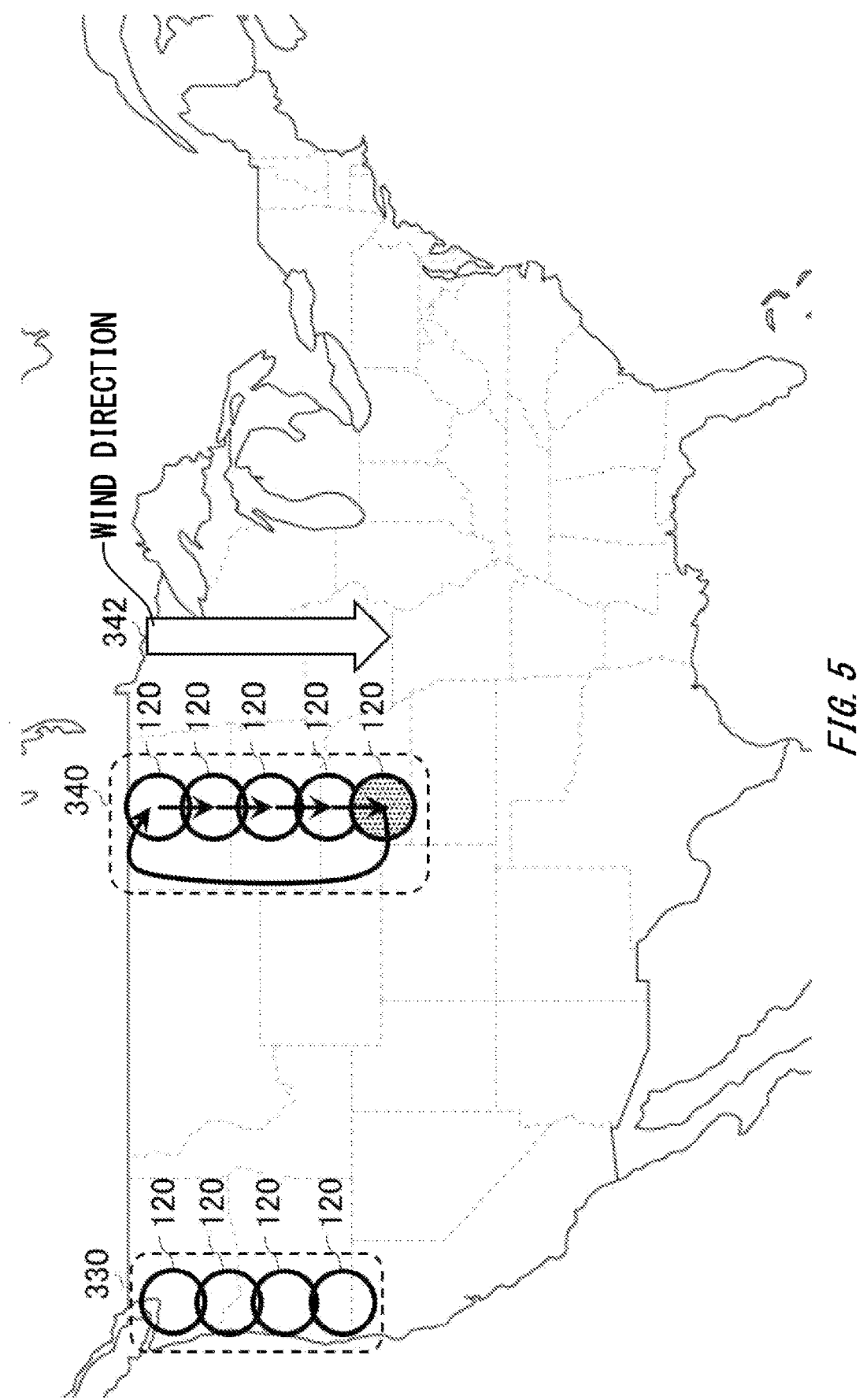
FIG. 5 shows schematically an example of a communication area 120 that is formed by each of the plurality of flight vehicles 100.

FIG. 5 shows schematically an example of the communication area 120 that is formed by each of the plurality of flight vehicles 100. FIG. 5 exemplifies a plurality of communication areas 120 in a weak wind area 330 and a plurality of communication areas 120 in a strong wind area 340. The weak wind area 330 is an area in which a wind speed is smaller than in the strong wind area 340.

In the weak wind area 330, the control device 200 controls the plurality of flight vehicles 100 in the first mode. FIG. 5 exemplifies the communication areas 120 formed by the four flight vehicles 100.

In the strong wind area 340, the control device 200 controls the plurality of flight vehicles 100 in the third mode. FIG. 5 exemplifies the communication areas 120 formed by the five flight vehicles 100. The five flight vehicles 100 move along a wind direction 342 from a starting point toward an ending point of a target area. The flight vehicle 100 that reaches the ending point of the target area stops formation of the communication area 120, and moves from the ending point toward the starting point in an opposite direction to the wind direction 342.

Figure 6:
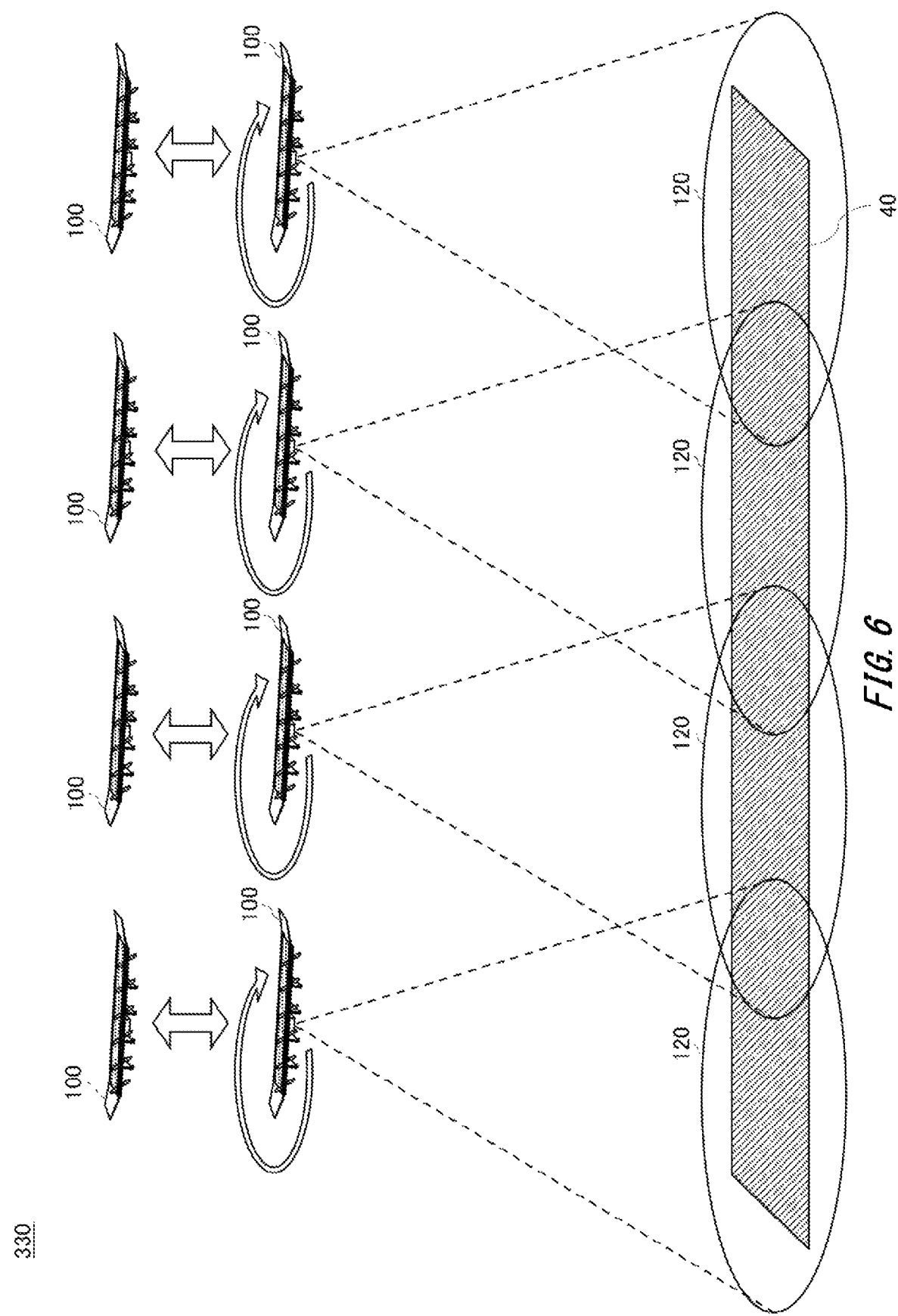
FIG. 6 shows schematically an example of the plurality of flight vehicles 100 that is controlled in a second mode.

FIG. 6 shows schematically an example of the plurality of flight vehicles 100 that is controlled in the second mode. Here, an example where every two of the eight flight vehicles 100 cover each part of the target area 40 is shown. In the example shown in FIG. 6, the control device 200 causes the two flight vehicles 100 to cover each part of the target area 40.

Figure 7:
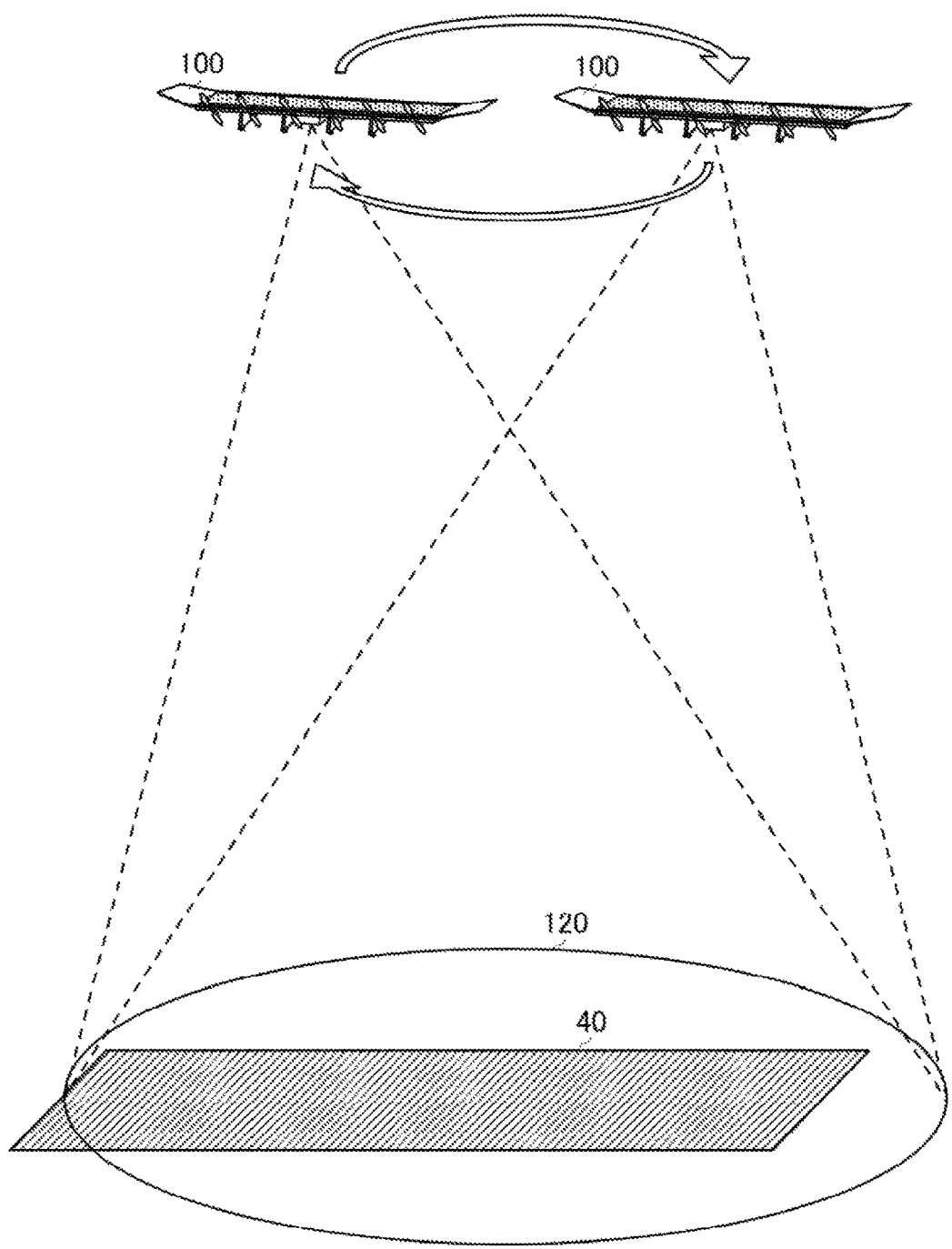
FIG. 7 shows schematically an example of two flight vehicles 100 that are controlled in the second mode during the day-time.

FIG. 7 shows schematically an example of the two flight vehicles 100 that are controlled in the second mode during the day-time. The control device 200 causes each of the two flight vehicles 100 to form the communication area 120 and perform stationary flight, and then cover the target area. The two flight vehicles 100 form the communication area 120, so that it is possible to increase the communication capacity, as compared to a case where one flight vehicle 100 forms the communication area 120.

Figure 8:
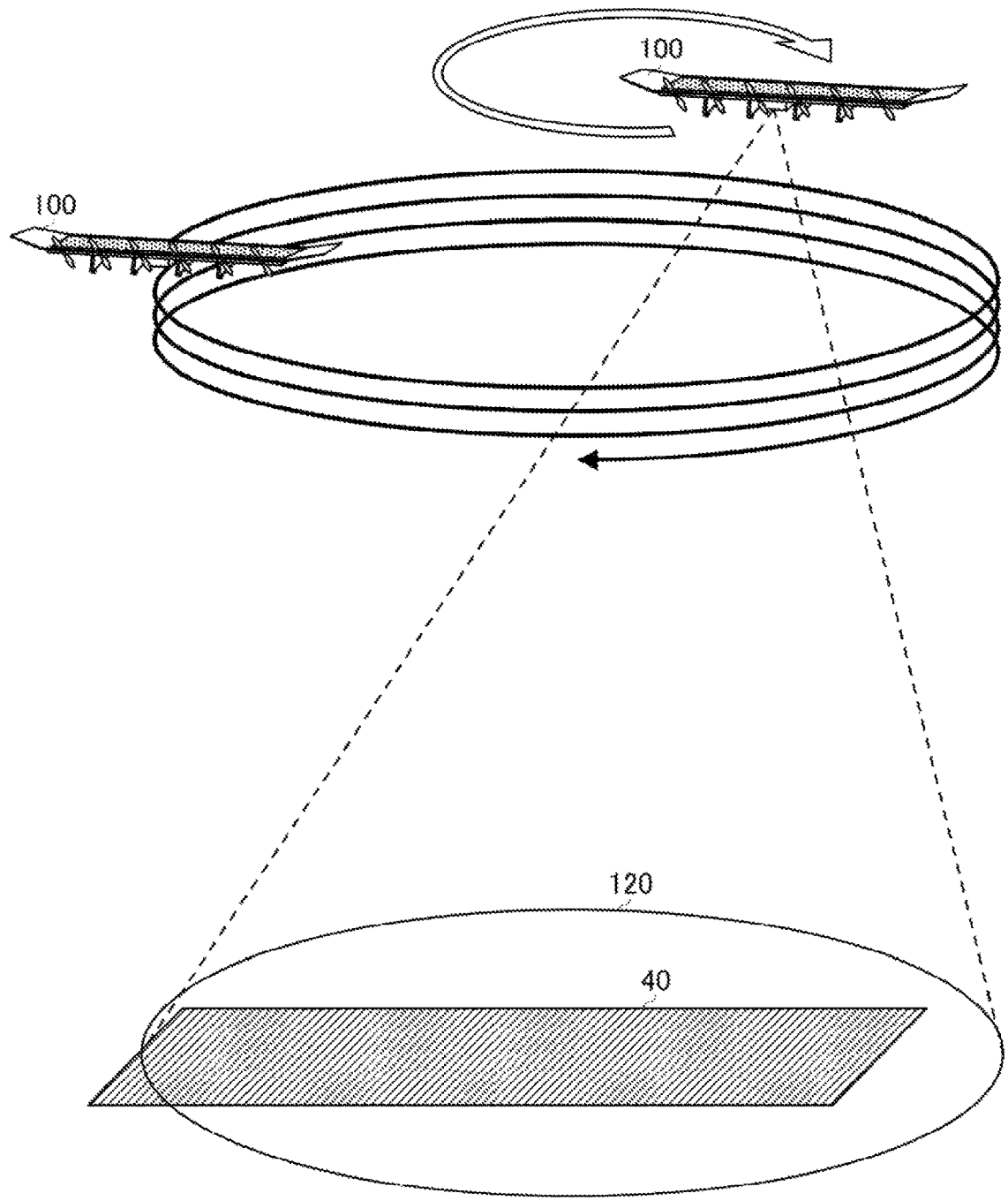
FIG. 8 shows schematically an example of two flight vehicles 100 that are controlled in the second mode during the night-time.

FIG. 8 shows schematically an example of the two flight vehicles 100 that are controlled in the second mode during the night-time. In a first half during the night-time, the control device 200 causes the second flight vehicle 100, of the first flight vehicle 100 and the second flight vehicle 100, not to cover the target area 40 and causes the first flight vehicle 100 to cover the target area 40, and in a second half during the night-time, the control device 200 causes the first flight vehicle 100 not to cover the target area 40 and causes the second flight vehicle 100 to cover the target area 40.

The control device 200 causes the flight vehicle 100, which does not cover the target area 40, to stop formation of the communication area 120 and to fly by a flying method where electric power consumed in flight is less than that of the flight vehicle 100 that covers the target area 40. For example, the control device 200 causes the flight vehicle 100, which does not cover the target area 40, to fly by a flying method where a gliding time is longer than that in a flying method of the flight vehicle 100 that covers the target area 40. The example shown in FIG. 8 shows that the flight vehicle 100, which does not cover the target area 40, is gliding while circling. The flying method shown in FIG. 8 is exemplary. That is, the control device 200 may cause the flight vehicle 100, which does not cover the target area 40, to fly by any flying method as long as it is a flying method where electric power consumed in flight is less than that of the flight vehicle 100 that covers the target area 40.

The control device 200 may cause the flight vehicle 100, which does not cover the target area 40, to fly at an altitude lower than an altitude at which the flight vehicle 100, which covers the target area 40, is flying. The control device 200 may cause the flight vehicle 100, which does not cover the target area 40, to fly at an altitude lower than an altitude at which the flight vehicle 100, which covers the target area 40, is flying and by the flying method where electric power consumed in flight is less than the flying method of the flight vehicle 100 that covers the target area 40.

In the examples shown in FIGS. 2 to 8, in a case where the control device 200 is equipped on the ground, the control device 200 may control the plurality of flight vehicles 100 via the network 20 and the gateway 22. The control device 200 may also control the plurality of flight vehicles 100 via the communication satellite.

In the examples shown in FIGS. 2 to 8, in a case where the control device 200 is mounted on any one of the plurality of flight vehicles 100, the control device 200 may control the plurality of flight vehicles 100 by enabling the plurality of flight vehicles 100 to communicate with each other. The plurality of flight vehicles 100 may communicate with each other via the communication satellite, for example. The plurality of flight vehicles 100 may also communicate with each other via the gateway 22.

Figure 9:
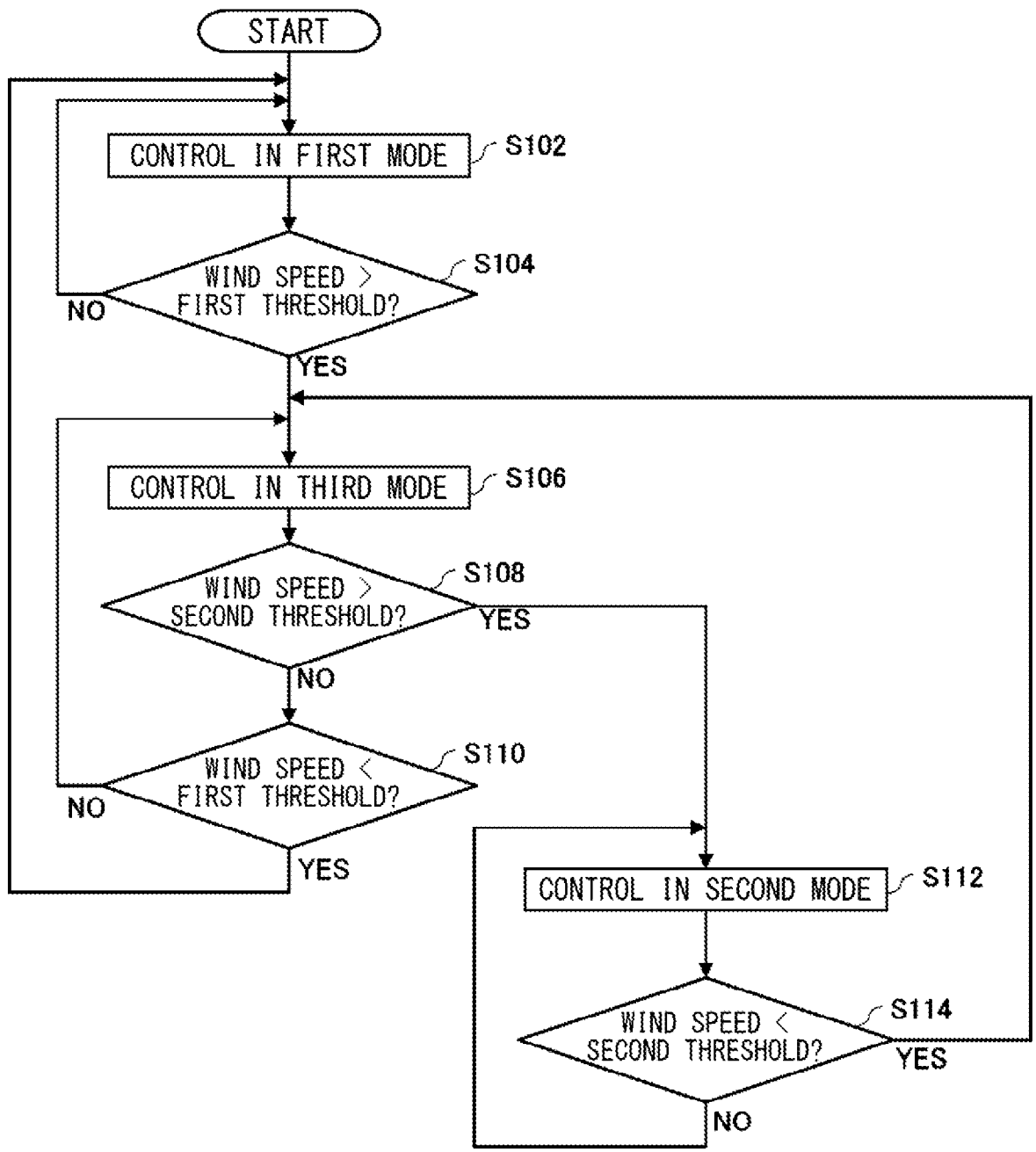
FIG. 9 shows schematically an example of a flow of processing that is performed by a control device 200.

FIG. 9 shows schematically an example of a flow of processing that is performed by the control device 200. FIG. 9 shows an example of a flow of processing that is performed when the control device 200 controls the plurality of flight vehicles 100 in the different modes, according to the wind speed in the flight area in which the plurality of flight vehicles 100 flies. Here, a state where there is no wind over the target area is described as a start state.

In step (which may be abbreviated as S) 102, the control device 200 controls the plurality of flight vehicles 100 in the first mode. Each of the plurality of flight vehicles 100 performs stationary flight over each part of the target area, thereby covering each part of the target area.

In S104, the control device 200 determines whether the wind speed in the flight area is greater than the first threshold value. When a result of the determination is Yes, the flow proceeds to S106, and otherwise, returns to S102. Even though the wind speed is temporarily greater than the first threshold value, if the state where the wind speed is greater than the first threshold value does not continue for a predetermined time, for example, the control device 200 may determine that the wind speed is not strong, and if the wind speed is continuously greater than the first threshold value for the predetermined time, the control device may determine that the wind speed is strong.

In S106, the control device 200 adds a spare flight vehicle to the plurality of flight vehicles 100, and controls the plurality of flight vehicles 100 in the third mode. The spare flight vehicle may be waiting in the sky, for example. The spare flight vehicle may also be waiting on the ground.

In S108, the control device 200 determines whether the wind speed in the flight area is greater than the second threshold value. When a result of the determination is Yes, the flow proceeds to S112, and otherwise, proceeds to S110. In S110, the control device 200 determines whether the wind speed in the flight area is smaller than the first threshold value. When a result of the determination is Yes, the flow returns to S102, and otherwise, returns to S106. When returning to S102, the control device 200 may move any one of the plurality of flight vehicles 100 to a standby position, as a spare flight vehicle.

In S112, the control device 200 adds a spare flight vehicle to the plurality of flight vehicles 100, and controls the plurality of flight vehicles 100 in the second mode. The spare flight vehicle may be waiting in the sky, for example. The spare flight vehicle may also be waiting on the ground.

In S114, the control device 200 determines whether the wind speed in the flight area is smaller than the second threshold value. When a result of the determination is Yes, the flow returns to S106, and otherwise, returns to S112. When the flow returns to S106, the control device 200 may move any one of the plurality of flight vehicles 100 to a standby position, as a spare flight vehicle.

Figure 10:
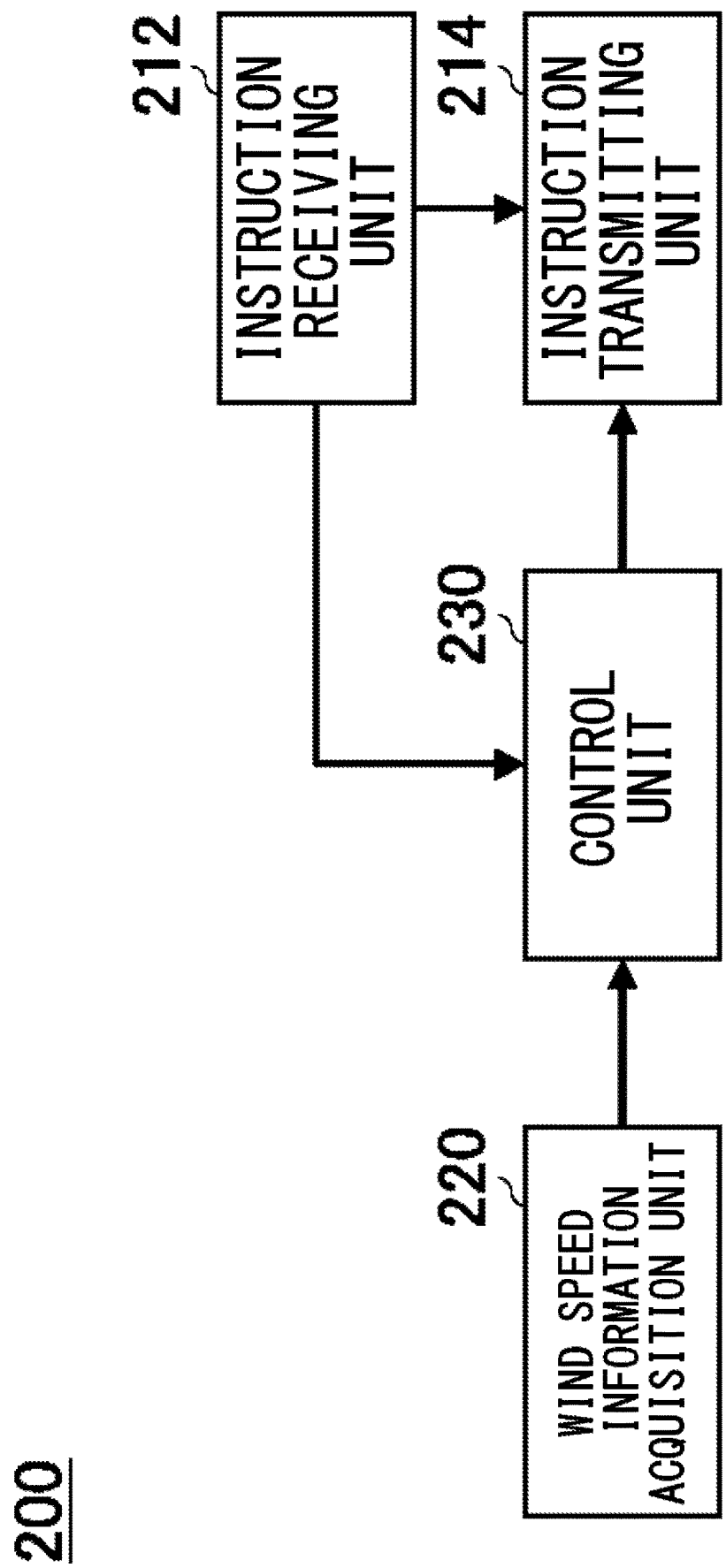
FIG. 10 shows schematically an example of a functional configuration of the control device 200.

FIG. 10 shows schematically an example of a functional configuration of the control device 200. The control device 200 includes an instruction receiving unit 212, an instruction transmitting unit 214, a wind speed information acquisition unit 220, and a control unit 230.

The instruction receiving unit 212 receives a variety of instructions. The instruction receiving unit 212 receives an instruction to designate the target area 40, for example. The instruction receiving unit 212 may receive an instruction to designate the starting point 42 and the ending point 44. The instruction receiving unit 212 may receive an instruction to designate the moving route from the starting point 42 to the ending point 44. The instruction receiving unit 212 may receive an instruction to designate the moving route from the ending point 44 to the starting point 42. The instruction receiving unit 212 may receive an instruction that is input via an operation unit which the control device 200 includes. The instruction receiving unit 212 may also receive an instruction received via the network 20, via a communication unit which the control device 200 includes.

The instruction transmitting unit 214 transmits the instruction received by the instruction receiving unit 212 to the flight vehicle 100. The instruction transmitting unit 214 may transmit the instruction to the plurality of flight vehicles 100. The instruction transmitting unit 214 may also transmit the instruction to one flight vehicle 100 of the plurality of flight vehicles 100, and the one flight vehicle 100 may transmit the instruction to the other flight vehicles 100.

The wind speed information acquisition unit 220 acquires the wind speed information. The wind speed information may include the wind direction information. The wind speed information acquisition unit 220 may acquire the wind speed information over the target area. The wind speed information acquisition unit 220 may receive the wind speed information from the weather information providing device 400.

The control unit 230 controls the plurality of flight vehicles 100. The control unit 230 controls the plurality of flight vehicles 100 in the first mode, for example. The control unit 230 may transmit a position of the target area that is covered by each of the plurality of flight vehicles 100 to each of the plurality of flight vehicles 100. The control unit 230 may transmit a position of the flight area in which each of the plurality of flight vehicles 100 flies to each of the plurality of flight vehicles 100.

The control unit 230 also controls the plurality of flight vehicles 100 in the second mode, for example. For example, the control unit 230 controls the first flight vehicle and the second flight vehicle so that during the first time period, the second flight vehicle of the first flight vehicle and the second flight vehicle corresponding to a first target area is caused not to cover the first target area and the first flight vehicle is caused to cover the first target area, and during the second time period, the first flight vehicle is caused not to cover the first target area and the second flight vehicle is caused to cover the first target area. When causing three or more flight vehicles 100 to cover the first target area, each of the three flight vehicles 100 may be caused to cover in turn the first target area. The first time period and the second time period may be night-time. The first time period may be a first half of the night-time, and the second time period may be a second half of the night-time.

The control unit 230 may control the first flight vehicle and the second flight vehicle so that the second flight vehicle is caused not to form the communication area 120 during the first time period and the first flight vehicle is caused not to form the communication area 120 during the second time period.

The control unit 230 may control flying of the first flight vehicle and the second flight vehicle so that during the first time period, the second flight vehicle is caused to fly at a predetermined altitude or by a predetermined flying method where electric power consumed in flight is less than that of the first flight vehicle that covers the first target area, and during the second time period, the first flight vehicle is caused to fly at a predetermined altitude or a predetermined flying method where electric power consumed in flight is less than that of the second flight vehicle that covers the first target area. The predetermined altitude at which electric power consumed in flight is less than that of the first flight vehicle that covers the first target area may be an altitude lower than an altitude at which the first flight vehicle is flying, and the predetermined altitude at which electric power consumed in flight is less than that of the second flight vehicle that covers the first target area may be an altitude lower than an altitude at which the second flight vehicle is flying. The predetermined flying method where electric power consumed in flight is less than that of the first flight vehicle that covers the first target area may be a method where a gliding time is longer than that in a flying method of the first flight vehicle, and the predetermined flying method where electric power consumed in flight is less than that of the second flight vehicle that covers the first target area may be a method where a gliding time is longer than that in a flying method of the second flight vehicle.

The control unit 230 may control the first flight vehicle and the second flight vehicle so that both the first flight vehicle and the second flight vehicle are caused to cover the first target area during the third time period. The third time period may be any time other than the night-time.

The control unit 230 also controls the plurality of flight vehicles 100 in the third mode, for example. The control unit 230 may control the plurality of flight vehicles 100 so that the communication area 120 of each of the plurality of flight vehicles 100 moves while covering a part of the target area and the target area is entirely covered by the plurality of the communication areas 120 of the plurality of flight vehicles 100. The control unit 230 may control the flight vehicle so that the flight vehicle 100 that reaches an ending point of the target area flies in a second flight area different from the first flight area in which the flight vehicle flies while covering the target area and then moves to a starting point of the target area. A wind direction in the first flight area may follow a flying direction of the flight vehicle that flies while covering the target area, and a wind direction in the second flight area may be opposite to the wind direction in the first flight area.

The control unit 230 may control the flight vehicle so as to fly in the second flight area where a wind speed is smaller than in the first flight area and to move the starting point of the target area. The control unit 230 may cause the flight vehicle 100 not to form the communication area while the flight vehicle 100 is flying in the second flight area.

The control unit 230 may acquire the wind speed information from the wind speed information acquisition unit 220, and control the plurality of flight vehicles 100, based on the wind speed information. For example, the control unit 230 controls the plurality of flight vehicles 100 in the first mode when a wind speed indicated by the wind speed information is smaller than the first threshold value. The control unit 230 also controls the plurality of flight vehicles 100 in the third mode when the wind speed indicated by the wind speed information is greater than the first threshold value and is smaller than the second threshold value larger than the first threshold value. The control unit 230 also controls the plurality of flight vehicles 100 in the second mode when the wind speed indicated by the wind speed information is greater than the second threshold value.

During the summer in the Northern Hemisphere and the winter in the Southern Hemisphere, the control unit 230 may move some of the plurality of flight vehicles 100 in the Northern Hemisphere to the Southern Hemisphere. During the winter in the Northern Hemisphere and the summer in the Southern Hemisphere, the control unit 230 may move some of the plurality of flight vehicles 100 in the Southern Hemisphere to the Northern Hemisphere. The flight vehicle 100 after the movement may cover a designated area, and wait at a standby position, as a spare flight vehicle. Thereby, it is possible to increase the number of the flight vehicles 100 in a region where the season is winter and an amount of electric power generated by sunlight is small.

Figure 11:
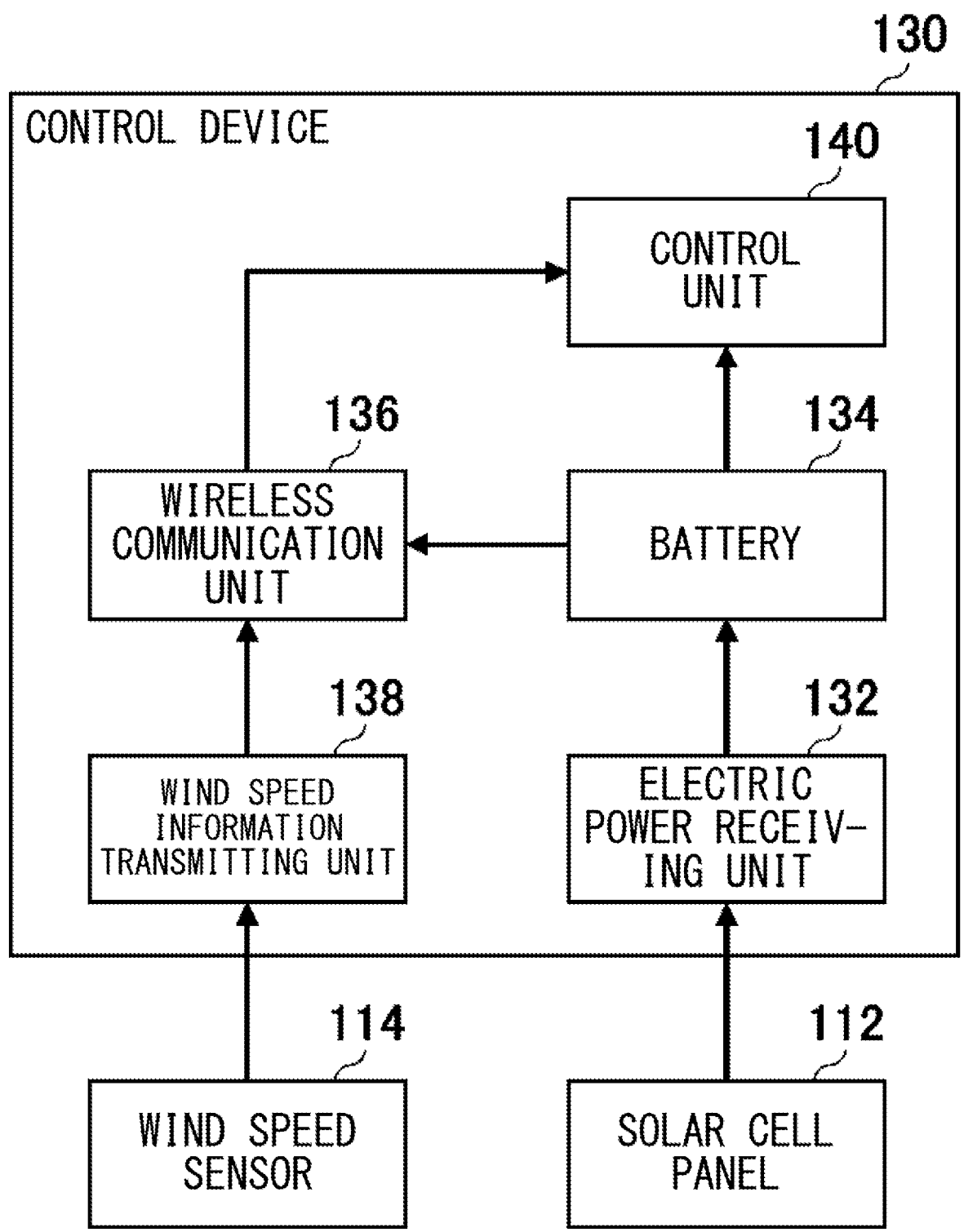
FIG. 11 shows schematically an example of a functional configuration of a control device 130 mounted in a flight vehicle 100.

FIG. 11 shows schematically an example of a functional configuration of a control device 130 included in the flight vehicle 100. The control device 130 comprises an electric power receiving unit 132, a battery 134, a wireless communication unit 136, a wind speed information transmitting unit 138, and a control unit 140.

The electric power receiving unit 132 receives electric power generated by the solar cell panel 112. The electric power receiving unit 132 stores the received electric power in the battery 134.

The wireless communication unit 136 performs diverse communications by using the electric power stored in the battery 134. The wireless communication unit 136 forms, for example, the communication area 120. The wireless communication unit 136 may communicate with the control device 200. The wireless communication unit 136 may communicate with the other flight vehicles 100. The wireless communication unit 136 may communicate with the communication satellite.

The wind speed information transmitting unit 138 transmits the wind speed information detected by the wind speed sensor 114 to the control device 200 and the like. The wind speed information transmitting unit 138 may transmit the wind speed information via the wireless communication unit 136.

The control unit 140 controls flying and the like of the flight vehicle 100. The control unit 140 may control flying and the like of the flight vehicle 100 according to an instruction from the control device 200.

For example, when receiving a control signal for control in the second mode from the control device 200, the control unit 140 causes the flight vehicle to fly at the predetermined altitude or by the predetermined flying method where during the first time period, the target area on the ground is covered by the communication area 120, and during the second time period, the communication area 120 is not formed and electric power consumed in flight is less than that in a case where the target area is covered.

For example, when receiving a control signal for control in the third mode from the control device 200, the control unit 140 also controls the flight vehicles 100 so that the communication area 120 of each of the plurality of flight vehicles 100 including another flight vehicle 100 moves while covering a part of the target area and the target area is entirely covered by the plurality of the communication areas 120 of the plurality of flight vehicles 100. The control unit 140 may control the flight vehicle 100 so that the flight vehicle 100 that reaches an ending point of the target area flies in the second flight area different from the first flight area in which the flight vehicle flies while covering the target area and then moves to the starting point of the target area.

Figure 12:
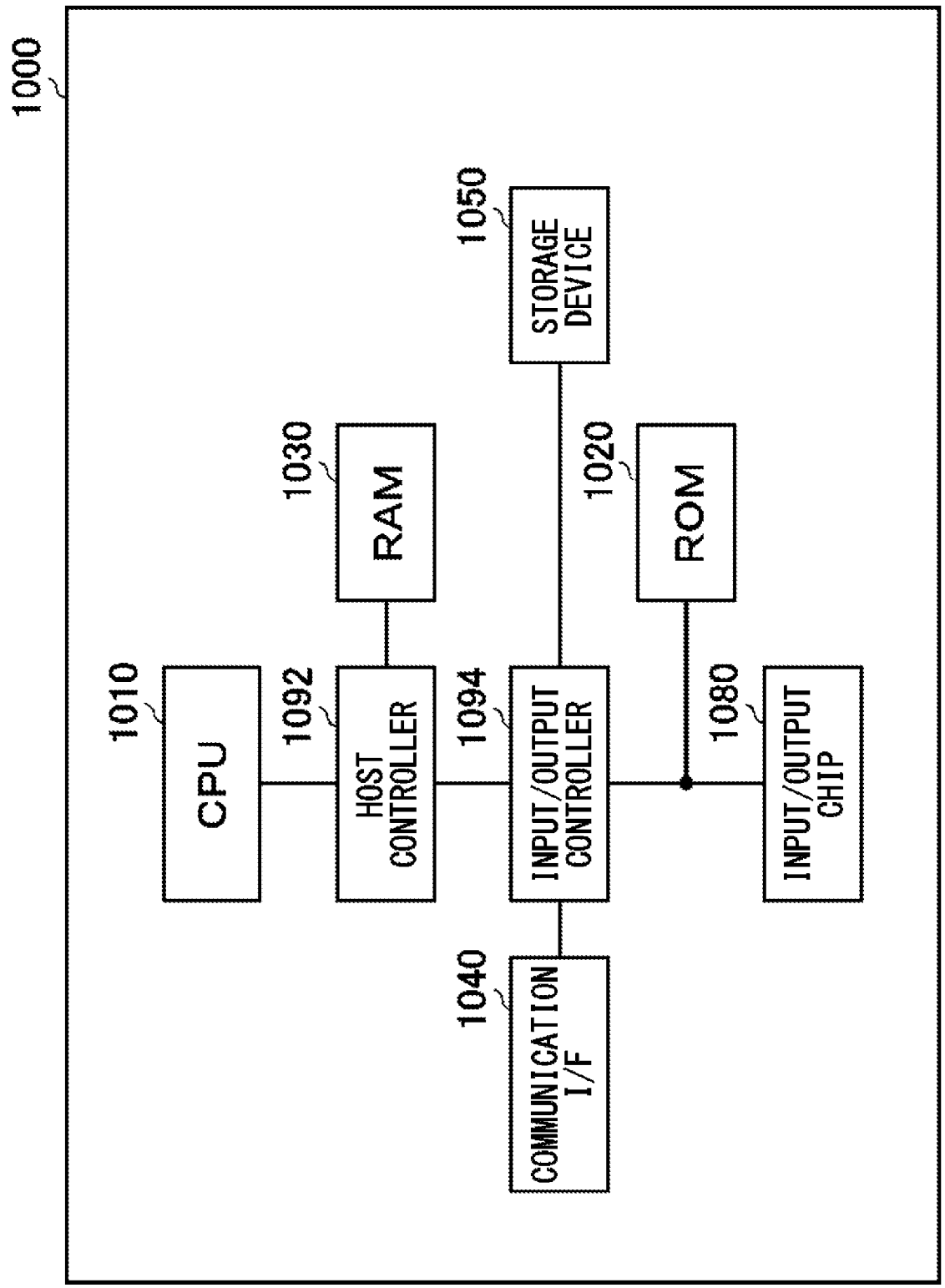
FIG. 12 shows schematically an example of a hardware configuration of a computer 1000 functioning as the control device 200.

FIG. 12 shows schematically an example of a computer 1000 functioning as the control device 200. The computer 1000 in accordance with the present embodiment includes a CPU peripheral unit including a CPU 1010 and a RAM 1030, which are mutually connected by a host controller 1092, and an input/output unit including a ROM 1020, a communication OF 1040, a storage device 1050 and an input/output chip 1080, which are connected to the host controller 1092 by an input/output controller 1094.

The CPU 1010 operates based on programs stored in the ROM 1020 and the RAM 1030, thereby controlling each unit. The communication OF 1040 communicates with other devices via the network. The communication OF 1040 also functions as hardware for performing communication. The storage device 1050 may be a hard disk drive, a solid state disk, a solid state drive and the like, and stores programs and data that are used by the CPU 1010.

The ROM 1020 stores therein a boot program that is performed by the computer 1000 at the time of activation, and a program depending on the hardware of the computer 1000. The input/output chip 1080 connects various input/output units to the input/output controller 1094 via a USB port, a parallel port, a serial port, a keyboard port, a mouse port and the like.

The program that is provided to the storage device 1050 via the RAM 1030 is provided with being stored in a recording medium such as an IC card by a user. The program is read from the recording medium, installed into the storage device 1050 via the RAM 1030, and performed by the CPU 1010.

The program installed in the computer 1000 to cause the computer 1000 to function as the control device 200 activates the CPU 1010 and the like to cause the computer 1000 to function as the respective units of the control device 200. The information processing described in the programs functions as the instruction receiving unit 212, the instruction transmitting unit 214, the wind speed information acquisition unit 220, and the control unit 230, which are specific means in which software and various types of hardware resources cooperate with each other, as the programs are read into the computer 1000. The specific means implements calculation or processing of information according to a use purpose of the computer 1000 of the present embodiment, so that the specific control device 200 is established according to the use purpose.

Figure 13:
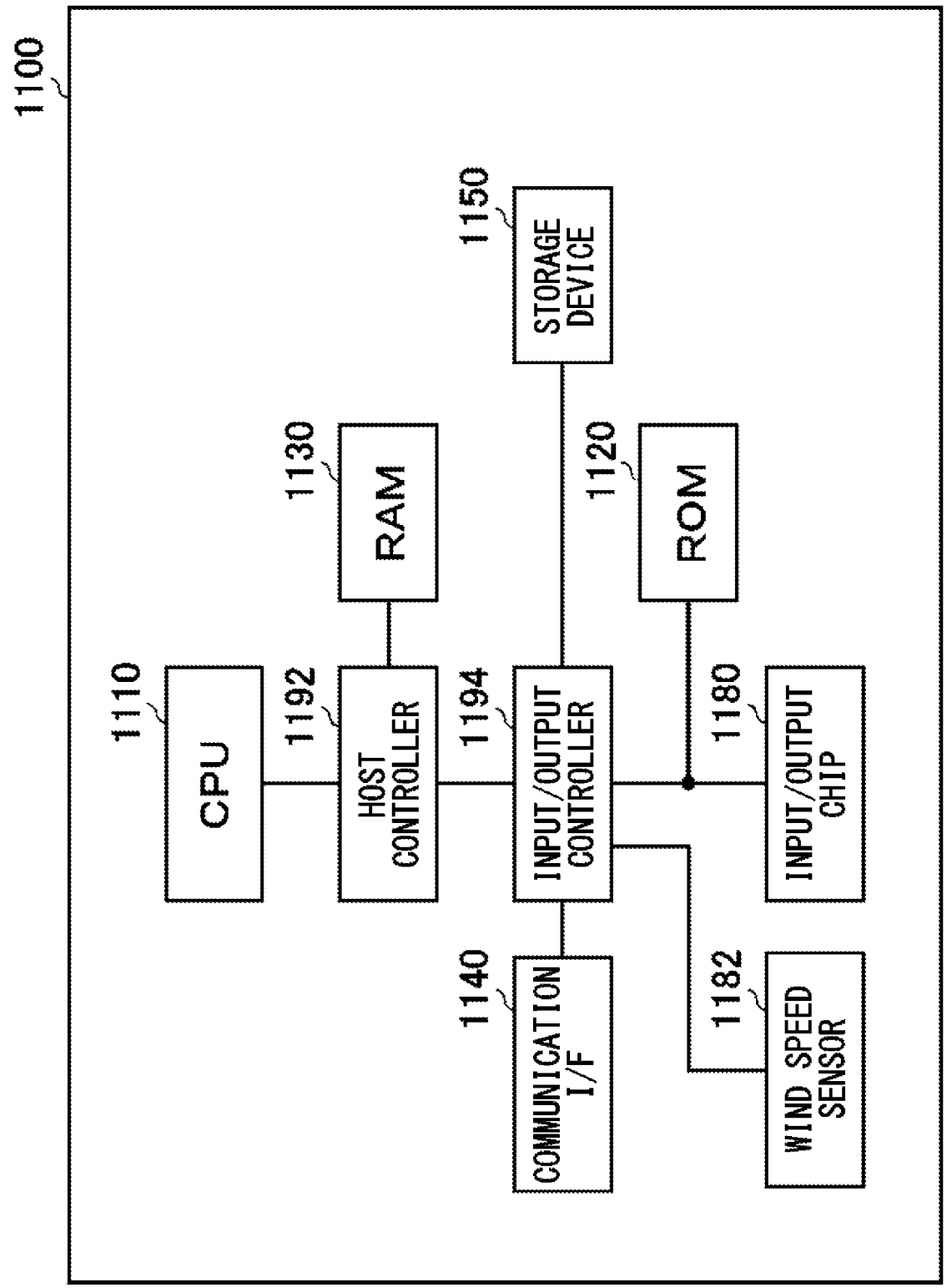
FIG. 13 shows schematically an example of a hardware configuration of a computer 1100 functioning as the control device 130.

FIG. 13 shows schematically an example of a computer 1100 functioning as the control device 130. The computer 1100 in accordance with the present embodiment includes a CPU peripheral unit including a CPU 1110 and a RAM 1130, which are mutually connected by a host controller 1192, and an input/output unit including a ROM 1120, a communication I/F 1140, a storage device 1150, an input/output chip 1180 and a wind speed sensor 1182, which are connected to the host controller 1192 by an input/output controller 1194.

The CPU 1110 operates based on programs stored in the ROM 1120 and the RAM 1130, thereby controlling each unit. The communication I/F 1140 communicates with other devices via the network. The communication I/F 1140 also functions as hardware for performing communication. The storage device 1150 may be a hard disk drive, a solid state disk, a solid state drive and the like, and stores programs and data that are used by the CPU 1110.

The ROM 1120 stores therein a boot program that is performed by the computer 1100 at the time of activation, and a program depending on the hardware of the computer 1100. The input/output chip 1180 connects various input/output units to the input/output controller 1194 via a USB port, a parallel port, a serial port, a keyboard port, a mouse port and the like. The wind speed sensor 1182 may be a sensor for detecting the wind speed in the flight area in which the flight vehicle 100 having the control device 130 mounted thereon flies.

The program that is provided to the storage device 1150 via the RAM 1130 is provided with being stored in a recording medium such as an IC card by a user. The program is read from the recording medium, installed into the storage device 1150 via the RAM 1130, and performed by the CPU 1110.

The program installed in the computer 1100 to cause the computer 1100 to function as the control device 130 activates the CPU 1110 and the like to cause the computer 1100 to function as the respective units of the control device 130.

The information processing described in the programs functions as the electric power receiving unit 132, the battery 134, the wireless communication unit 136, the wind speed information transmitting unit 138, and the control unit 140, which are specific means in which software and various types of hardware resources cooperate with each other, as the programs are read into the computer 1100. The specific means implements calculation or processing of information according to a use purpose of the computer 1100 of the present embodiment, so that the specific control device 130 is established according to the use purpose.

While the present invention has been described using the embodiments, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

20: network, 22: gateway, 30: user terminal, 40: target area, 42: starting point, 44: ending point, 100: flight vehicle, 102: main body, 104: main wing, 106: propeller, 108: skid, 110: wheel, 112: solar cell panel, 114: wind speed sensor, 120: communication area, 122: cell, 130: control device, 132: electric power receiving unit, 134: battery, 136: wireless communication unit, 138: wind speed information transmitting unit, 140: control unit, 200: control device, 212: instruction receiving unit, 214: instruction transmitting unit, 220: wind speed information acquisition unit, 230: control unit, 310: flight area, 320: flight area, 330: weak wind area, 340: strong wind area, 400: weather information providing device, 1000: computer, 1010: CPU, 1020 ROM, 1030: RAM, 1040: communication I/F, 1050: storage device, 1080: input/output chip, 1092: host controller, 1094: input/output controller, 1100: computer, 1110: CPU, 1120: ROM, 1130: RAM, 1140: communication I/F, 1150: storage device, 1180: input/output chip, 1182: wind speed sensor, 1192: host controller, 1194: input/output controller

What is claimed is:

1. A control device for controlling a flight vehicle including: a solar cell panel; and an antenna for forming a communication area on the ground to provide wireless communication service for a user terminal in the communication area by using electric power generated by the solar cell panel, the control device comprising:
a control unit for controlling a first flight vehicle and a second flight vehicle so that during a first time period, the second flight vehicle of the first flight vehicle and the second flight vehicle is caused not to cover a first target area and the first flight vehicle is caused to cover the first target area, and during a second time period following the first time period, the first flight vehicle is caused not to cover the first target area and the second flight vehicle is caused to cover the first target area, wherein
the control unit controls flight of the first flight vehicle and the second flight vehicle so that during the first time period, the second flight vehicle is caused to fly at a predetermined altitude or by a predetermined flying method where electric power consumed in flight is less than that of the first flight vehicle that covers the first target area, and during the second time period, the first flight vehicle is caused to fly at a predetermined altitude or by a predetermined flying method where electric power consumed in flight is less than that of the second flight vehicle that covers the first target area.

2. The control device according to claim 1, wherein
the control unit controls the first flight vehicle and the second flight vehicle so that the second flight vehicle is caused not to form the communication area during the first time period and the first flight vehicle is caused not to form the communication area during the second time period.

3. The control device according to claim 1, wherein
the predetermined altitude at which electric power consumed in flight is less than that of the first flight vehicle that covers the first target area is an altitude lower than an altitude at which the first flight vehicle is flying, and the predetermined altitude at which electric power consumed in flight is less than that of the second flight vehicle that covers the first target area is an altitude lower than an altitude at which the second flight vehicle is flying.

4. The control device according to claim 1, wherein
the predetermined flying method where electric power consumed in flight is less than that of the first flight vehicle that covers the first target area has a longer gliding time than a flying method of the first flight vehicle, and the predetermined flying method where electric power consumed in flight is less than that of the second flight vehicle that covers the first target area has a longer gliding time than a flying method of the second flight vehicle.

5. The control device according to claim 1, wherein
the control device is arranged on the ground.

6. A control device for controlling a flight vehicle including: a solar cell panel; and an antenna for forming a communication area on the ground to provide wireless communication service for a user terminal in the communication area by using electric power generated by the solar cell panel, the control device comprising:
a control unit for controlling a first flight vehicle and a second flight vehicle so that during a first time period, the second flight vehicle of the first flight vehicle and the second flight vehicle is caused not to cover a first target area and the first flight vehicle is caused to cover the first target area, and during a second time period following the first time period, the first flight vehicle is caused not to cover the first target area and the second flight vehicle is caused to cover the first target area;
a wind speed information acquisition unit for acquiring wind speed information indicative of a wind speed in a flight area where each of a plurality of flight vehicles including the first flight vehicle and the second flight vehicle is flying; wherein
when a wind speed in the flight area where the first flight vehicle is flying is smaller than a first threshold value, the control unit controls the first flight vehicle in a first mode controlling so that the first target area is covered only by the first flight vehicle, and when the wind speed in the flight area where the first flight vehicle is flying is greater than the first threshold value, the control unit controls the first flight vehicle and the second flight vehicle in a second mode controlling so that the second flight vehicle is caused not to cover the first target area and the first flight vehicle is caused to cover the first target area during the first time period, and the first flight vehicle is caused not to cover the first target area and the second flight vehicle is caused to cover the first target area during the second time period.

7. A control device for controlling a flight vehicle including an antenna for forming a communication area on the ground to provide wireless communication service for a user terminal in the communication area, the control device comprising:

a control unit for controlling a plurality of flight vehicles so that a communication area of each of the plurality of flight vehicles moves while covering a part of a predetermined target area and the target area is entirely covered by a plurality of communication areas of the plurality of flight vehicles, wherein the control unit controls the flight vehicle so that the flight vehicle that reaches an ending point of the target area flies in a second flight area different from a first flight area in which the flight vehicle flies while covering the target area and then moves to a starting point of the target area, wherein a wind direction in the first flight area follows a flying direction of the flight vehicle that flies while covering the target area, and a wind direction in the second flight area is opposite to the wind direction in the first flight area.

8. A control device for controlling a flight vehicle including an antenna for forming a communication area on the ground to provide wireless communication service for a user terminal in the communication area, the control device comprising:

a control unit for controlling a plurality of flight vehicles so that a communication area of each of the plurality of flight vehicles moves while covering a part of a predetermined target area and the target area is entirely covered by a plurality of communication areas of the plurality of flight vehicles, wherein the control unit controls the flight vehicle so that the flight vehicle that reaches an ending point of the target area flies in a second flight area that is different from a first flight area in which the flight vehicle flies while covering the target area, a wind speed in the second flight area being smaller than in the first flight area, and then moves to a starting point of the target area.

9. The control device according to claim 7, wherein the control unit causes the flight vehicle not to form the communication area while the flight vehicle is flying in the second flight area.

10. A non-transitory computer readable medium having stored thereon instructions that, when executed by a processor, cause a control device for controlling a flight vehicle including: a solar cell panel; and an antenna for forming a communication area on the ground to provide wireless communication service for a user terminal in the communication area by using electric power generated by the solar cell panel, to function as a control unit, wherein the control unit controls a first flight vehicle and a second flight vehicle so that during a first time period, the second flight vehicle of the first flight vehicle and the second flight vehicle is caused not to cover a first target area and the first flight vehicle is caused to cover the first target area, and during a second time period following the first time period, the first flight vehicle is caused not to cover the first target area and the second flight vehicle is caused to cover the first target area, wherein the control unit controls flight of the first flight vehicle and the second flight vehicle so that during the first time period, the second flight vehicle is caused to fly at a predetermined altitude or by a predetermined flying method where electric power consumed in flight is less than that of the first flight vehicle that covers the first target area, and during the second time period, the first flight vehicle is caused to fly at a predetermined altitude or by a predetermined flying method where electric power consumed in flight is less than that of the second flight vehicle that covers the first target area.

* * * * *